United States Patent [19]

Harford

[11] Patent Number: 4,870,534
[45] Date of Patent: Sep. 26, 1989

[54] POWER LINE SURGE SUPPRESSOR

[76] Inventor: Jack R. Harford, P.O. Box 412, RD2, Flemington, N.J. 08822

[21] Appl. No.: 241,018

[22] Filed: Sep. 2, 1988

[51] Int. Cl.$^4$ .............................................. H02H 9/04
[52] U.S. Cl. ..................................... 361/58; 361/111; 361/118
[58] Field of Search .................. 361/54, 56, 58, 91, 361/110, 111, 118, 117

[56]  References Cited
U.S. PATENT DOCUMENTS 4,434,396  2/1984  Montague ...................... 361/111 X
4,751,607  6/1988  Smith ................................ 361/119

Primary Examiner—Todd E. Deboer
Attorney, Agent, or Firm—Kenneth R. Schaefer

[57] ABSTRACT

A surge suppressor for repeatedly protecting a load against surges occurring on A-C power mains from lightning surges or the like comprises a first series circuit having a first inductance and a first alternating voltage limiter, including at least a first capacitance and a bidirectionally conductive rectifier circuit, coupled between first and second input terminals. The first inductance conducts substantially all of the current supplied from the A-C power mains. A second series circuit comprising a second inductance and second alternating voltage limiter, including at least a second capacitance and a second bidirectionally conductive rectifier circuit, is coupled across the first alternating voltage limiter and is coupled to first and second output terminals. The first series circuit is arranged for limiting surge currents and voltage excursions passed to the second series circuit to first levels while the second series circuit is arranged for further limiting surge currents and voltage excursions passed to the output terminals to second levels less than first levels.

20 Claims, 1 Drawing Sheet

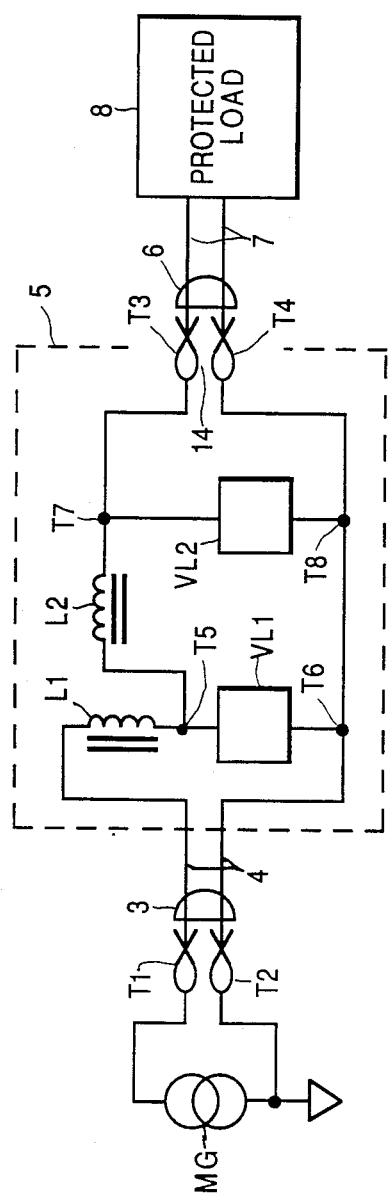
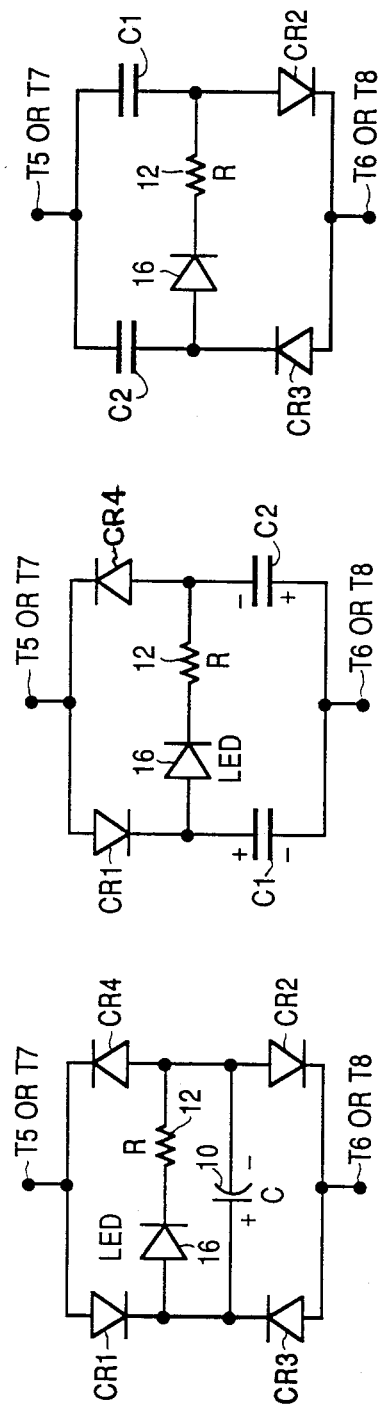

POWER LINE SURGE SUPPRESSOR

The present invention relates to power line surge suppressors which provide protection to electronic equipment even during lightning storms.

BACKGROUND OF THE INVENTION

Electronic equipment is susceptible to damage owing to high spike voltages being coupled to the A-C power mains from which they obtain operating energy. Such spike voltages can be caused by surges arising from inductive loads, lightning storms, or the like.

The highest potential transient spike voltages are short in duration, typically tens of microseconds. These high potential spikes can range into many thousands of volts, and many thousands of amperes. Such high voltages tend to overstress electronic components, subjecting them to hazardous and unwanted operating conditions. Owing to the low source impedance of the A-C mains and very high potentials involved, very large currents flow during component breakdown. As a result, dissipation in the components may be substantial, often resulting in their being destroyed.

Heretofore, it was customary to use power mains frequency isolation transformers in D-C power supplies obtaining energy from the A-C power mains, to isolate the power mains voltage from the equipment for safety reasons. The self-inductance and distributed capacitance of the isolation transformer windings integrated the energy contained in transients caused by lightning or other sources received from the A-C power mains. As a result, voltage excursions delivered to the load were minimal and were current limited by the transformer. More recently, to lower cost and reduce size and weight, there has been a tendency to eliminate mains isolation transformers. Instead, the A-C mains voltage frequency is rectified directly to supply direct operating voltage to a switched-mode voltage regulator. This regulator, in turn, provides electrical isolation via a high frequency transformer that supplies subsequent electronic equipment (such as a television receiver or computer equipment). This newer design (switched-mode supply) electronic equipment has proven to be undesirably susceptible to damage from surges or transients on the A-C power mains.

In response to this problem, a number of line surge suppressors have been marketed, though none to the knowledge of the present inventor has offered satisfactory protection for electronic equipment during lightning storms with reasonable life, cost and reliability. A number of available line surge suppressors contain voltage limiting devices (usually Metal Oxide Varistors—MOVs) for connection in shunt across the A-C power mains, which voltage limiting devices have very large ONE-TIME surge current handling capability—e.g. 4500 or 6500 amperes. Spark gaps, gas discharge tubes and zener diodes also have all been employed, but each such component has either a serious reliability problem or an operational characteristics problem, or both, as they are applied in power line surge suppressors (see, for example, U.S. Pat. Nos. 4,563,720—Clark, 3,793,535—Chowdhuri, 4,068,279—Byrnes, 4,463,406—Sirel, 4,628,394—Crosby et. al.).

A common problem with the generally accepted shunt protector design concept is that the A-C mains have a very low source impedance, so the shunt voltage regulation afforded by these voltage limiting devices is severely compromised due to the lack of current limiting. Furthermore, the high current rating of 4500 or 6500 amperes of such varistors is a ONE TIME rating, after which the characteristics of the metal oxide varistor are permanently compromised for subsequent transients. What has been found to be needed to make the shunt voltage regulation of the limiting devices effective is a series pass element to augment the impedance of the A-C power mains and the A-C line cord. Unless such a series-pass element is provided, a high energy transient applied directly across the varistor or other voltage limiting device is supplied from a very low source impedance that is capable of continuing to support current flow at unpredictably high currents, perhaps approaching or exceeding the limit of the surge current handling capability of the voltage limiting device, and compromising performance for subsequent transients. The thousand ampere or more surge current is accompanied by a several hundred volt peak voltage developed across the voltage limiting device, and the electronic equipment receiving operating voltage from across the voltage limiting device often succumbs to the overvoltage. This is so even though (as the manufacturers of the line surge suppressors point out) the line surge suppressor itself is capable of withstanding the rated lightning-caused surge at least once before becoming ineffectual. Furthermore, there is generally no indication given when the surge suppressor has experienced such an event and the transient protection of the varistor no longer meets the original specifications.

In order to provide the necessary protection, a series pass element is required between the A-C mains and the voltage limiter which is able to withstand 6,000 volts peak, which carries the line current and exhibits sufficiently low impedance that its insertion loss during normal operation at A-C power mains frequency is reasonably low, but exhibits high impedance and high loss during voltage spikes. While such requirements may be met by a suitably large inductor, in order to obtain sufficient impedance to limit the current flow in the voltage limiting device to a safe value during transient spikes in excess of 2000 volts on the A-C power mains while preventing the appearance of overvoltage or overcurrent at the voltage limiting device (typically a varistor—which may be required to dissipate over 1,000,000 watts during a transient), the inductor will be unduly expensive and bulky. Furthermore, problems arise with using inductors having high permeability magnetic structures (which is often done to reduce size and cost) in that high peak energy levels often associated with lightning-caused transients cause saturation in these magnetic structures and attendant loss of inductive reactance when it is needed most. That is, the series pass impedance is lower than required during such transients unless the magnetic structure is massive. Inductors with air gaps and low permeability magnetic structures, such as those of soft iron, may be used since they are less prone to characteristic shifts at high currents, and yet provide the required losses to protect equipment from transients.

It has been found to be difficult to obtain consistently adequate shunt regulation against high energy surge voltages utilizing only one stage of voltage limiting. Furthermore, voltage limiting devices can survive high energy surges indefinitely only if the current is properly limited. For these reasons, a cascade of shunt voltage limiters has been found to be desireable to protect a load such as a switching regulator from these surges on a repeated basis. The question then is what kind of shunt limiters should be used to provide safe voltages (less than 250 volts peak for 110 volt r.m.s. nominal A-C mains voltage, or about 1.5 times normal peak voltage) to the protected device, and still operate within reliable dissipation limits.

The prior art recognizes that voltage limiting devices tend to be slow acting, and that spikes caused by lightning and other high energy sources are of only tens of microseconds duration. Small value capacitors have been used in parallel with voltage limiting devices to shunt high frequency energy away from the equipment being protected by the line surge suppressor. Here too, previous designs tended to provide no (or an inadequate) series pass element, and the capacitors were of insufficient value to provide any degree of protection (being used mainly to provide high frequency noise filtering). Varistors have wide clamp tolerances, finite clamp impedance and limited life for high current transients. A typical varistor for nominal 110 volt A-C mains protection such as a GE Type V130LA10A is rated at 200 volts clamp onset voltage (a satisfactory value), with ability to withstand 4500 amperes surge current only ONE TIME, after which permanent changes take place that compromise performance. Moreover, the clamping level of that varistor is specified as 340 volts at 50 amperes of surge current (already an excessive voltage for 110 volt nominal mains voltage), with clamping voltage increasing in proportion to higher surge currents, up to about 500 volts at 2200 amperes, HALF the maximum rated current (a dangerously high voltage for many loads). Specification #587 of the Institute of Electrical and Electronics Engineers (IEEE) recommends that surge suppressors be suitable for use with a 6,000 volt, 3,000 ampere current source for major feeders, short branch feeders, and load centers.

Unless the current is limited to impractically low levels (30 GE Type V130LA10A), varistors would prove unreliable in the first stage. This is because any inductor that could limit a 6,000 volt transient to 30 amperes (approximately 1 millihenry) would have appreciable loss at the A-C mains frequency, and be physically large. The clamp voltage tolerance makes varistors impractical for the second stage, since the voltage transient should be limited as noted above, to 250 volts peak for 110 volt nominal A-C mains voltage for reliable protection. For example, a sample varistor with a nominal 200 volt onset clamp has a specification ONSET voltage that ranges from 184 volts to 228 volts, and therefore is likely to produce a much higher voltage under actual transient conditions.

SUMMARY OF THE INVENTION

The present invention is embodied in a line surge suppressor with the capability for reliably and repeatedly protecting a load such as a switched mode power converter against high energy transient spikes on a low impedance A-C power mains supplying input power to the load, which line surge suppressor is of the following type. A first alternating voltage limiting means is coupled in series connection with a first inductor between first and second input terminals, between which terminals the power mains voltage is supplied. The series connection functions as a first stage shunt regulator of transient voltage spikes. A second stage shunt regulator for transient voltage peaks is provided by a second inductor and a second alternating voltage limiting means in series connection across the first alternating voltage limiting means. In the preferred embodiments of this invention which include a cascade of a plurality of shunt regulators for transient voltage peaks, each alternating voltage limiting means comprises symmetrical peak detection (mains voltage tracking), clipper (peak limiting) and charge storage circuitry constructed using current rectifier diodes and at least one storage capacitor.

BRIEF DESCRIPTION OF THE DRAWING

FIG. 1 is a schematic diagram of the line surge suppressor embodying this invention, in which the first stage shunt regulator employs a first inductor and peak limiting circuitry and in which the second stage shunt regulator employs a second inductor and second peak limiting circuitry;

FIG. 2 is a schematic diagram of the preferred circuitry for the peak limiters of FIG. 1; and FIGS. 3 and 4 are schematic diagrams of modifications that may be made to the peak limiting circuitry of the FIG. 1 line surge suppressor, each such modification being an alternative embodiment of the invention.

DETAILED DESCRIPTION OF THE DRAWING

In FIG. 1, an alternating current (A-C) source MG represents a power mains voltage generator for delivering a nominal 110 volts at low impedance to terminals T1 and T2 of a common wall (household) receptacle. A two prong plug 3 of a line cord 4 of a line surge suppressor 5 is inserted into (connected to) terminals T1 and T2. Line cord 4 is included in the series connection of a first inductor L1 and a first voltage limiting means VL1, the limiting means VL1 being connected between terminals T5 and T6 to provide a first stage shunt regulator for limiting the amplitude of transient voltage spikes appearing across first voltage limiter VL1. Voltage peaks of either polarity are limited in amplitude by voltage limiter VL1. The inductor L1 conducts all of the current supplied from mains MG to the terminals T1, T2.

The 110 volts supplied at terminals T1 and T2 during normal (non-tranient) operation appears across voltage limiter VL1. During normal operation, this voltage would be suitable for being applied to output load terminals T3 and T4 of a line surge suppressor output receptacle 14. Output terminals T3 and T4 receive a plug 6 connecting via a line cord 7 to equipment 8 which is to be protected against high energy surges. A second surge shunt regulator is connected in cascade after the first surge shunt regulator provided by inductor L1 and voltage limiter VL1 in order that the voltage between output terminals T3 and T4 be properly contained to 250 volts peak or less during a line surge.

A second inductor L2 and a second means for limiting the amplitudes of voltage peaks of either polarity similarly (VL2) are in series connection across voltage limiter VL1 to provide this second surge shunt voltage regulator. The cores of inductors L1 and L2 preferably are oriented to minimize mutual inductance between them if they are packaged in proximity to each other, so that there is no substantial voltage transformer action between inductors L1 and L2 (e.g. the cores are physically oriented at 90° to each other).

The means VL1 and VL2 for limiting the amplitude of voltage peaks appearing between terminals T3 and T4 are shown as being connected in the circuit via terminals T5, T6, and T7, T8 respectively. Reference will be made to these four last-named terminals when describing how alternative means as shown in FIGS. 3 and 4 of the drawing are connected when such alternatives are used in other embodiments of the invention.

Second voltage limiter VL2 is a fast acting means for limiting voltage transient spikes, conducting in 50 nanoseconds or less after a transient exceeds the peak line voltage. Voltage limiter VL2 is a symmetrical peak limiting circuit which provides transient peak clipping action that disregards slower variations in the peak to peak amplitude of the A-C power mains voltage.

Referring to FIG. 2, either of voltage limiters VL1 or VL2 comprises four current rectifier diodes CR1, CR2, CR3, and CR4 in a full wave, full bridge configuration for developing across a capacitor 10 a voltage substantially equal to the normal peak value of the A-C power mains voltage (e.g. 155 volts). Since the A-C power mains voltage is relatively constant and repetitive, the voltage across capacitor 10 is relatively constant. A current discharge or bleeder resistor 12 discharges a small amount of the charge placed on capacitor 10 by the A-C power mains peak voltage so that the voltage across capacitor 10 represents the most recent value of the A-C power mains peak voltage, in spite of minor fluctuations in the mains voltage. When the A-C power mains voltage is at peak voltage and of a polarity for easy conduction for diodes CR1 and CR2 or diodes CR3 and CR4, as the case may be, capacitor 10 will receive charge on a repetitive basis until the voltage across capacitor 10 assumes the peak value of the A-C mains voltage. At that time, the rectifier diodes CR1, CR2, CR3, and CR4 cease conduction, except to replenish the charge depleted by the bleeder resistor 12. When a transient spike whose voltage is greater than the mains voltage occurs, depending on the polarity of the transient, either diodes CR1 and CR2 conduct or diodes CR3 and CR4 conduct, presenting a very low impedance to the transient. Capacitor 10 will absorb the transient current, and depending on the magnitude and duration of the transient, will be charged to a new voltage higher than the peak of the A-C mains voltage. The excess charge will be discharged by the bleeder resistor 12 until the voltage across capacitor 10 is again equal to the peak value of the A-C mains voltage. A light emitting diode (LED) 16 is coupled in series with bleeder resistor 12 to provide a visible indication that the surge protector is operating.

The embodiment of FIG. 2 is shown as having a single energy storage capacitor 10 and four current rectifier diodes CR1, CR2, CR3, and CR4 in full wave, full bridge peak detector connection for developing across capacitor 10 a voltage substantially equal to the normal peak value of the A-C power mains voltage. This arrangement is advantageous in terms of physical compactness over alternatives shown in FIGS. 3 and 4 which use two energy storage capacitors (C1 and C2), inasmuch as current rectifier diodes of the size required to dissipate remnant surge transient energy are considerably smaller and less expensive than the energy storage capacitors. Typical values for capacitor 10 in voltage limiter VL1 are 50–200 microfarads, 450 volts, and for capacitor 10 in voltage limiter VL2 are 50–200 microfarads, 250 volts, for a 110 volt, 15 ampere A-C power mains circuit. The lower voltage rating of capacitor 10 in the second voltage limiter VL2 (and consequent reduced cost and size) is made possible by the presence of the first current limiter stage VL1.

FIGS. 3 and 4 illustrate alternative forms limiters VL1 and VL2 may take, each of which uses a half-bridge, full wave limiter configuration rather than the full-bridge, full wave limiter configuration CR1, CR2, CR3, and CR4 of FIG. 1. In FIG. 3, diodes CR2 and CR3 are dispensed with, and capacitor 10 is replaced with energy storage capacitors C1 and C2. In FIG. 4, diodes CR1 and CR4 are dispensed with and capacitor 10 is replaced with capacitors C3 and C4.

It is generally accepted that lightning-induced transients are limited to about 6,000 volts by virtue of arc-over at electrical receptacles. When a 6,000 volt high energy surge occurs, simulated studies of the present invention using practical components have shown that up to 400 volts peak may appear across first limiter VL1, a peak voltage too large to be applied directly to terminals T3 and T4, as damage may result to sensitive electronic equipment from this voltage level (that is, electronic equipment is normally designed to sustain 1.5 to 2 times the normal peak line voltage). As noted above, a second surge shunt regulator is connected in cascade after the first surge shunt regulator provided by inductor L1 and limiter VL1, in order that the voltage between terminals T3 and T4 be properly contained to 250 volts peak or less during a line surge.

In order to prevent the initial fast rise time of a high energy spike from being coupled to the equipment to be protected, the present invention includes inductors as the respective series pass elements in both stages of shunt regulation. This introduces the possibility of parametric amplification of pulses, however, which is deleterious to providing adequate line surge suppression. By keeping the Q of the second inductor low, parametric amplification can be prevented. Computer studies were conducted that indicated that lossy inductors with Q's of 4 or less at the frequencies of the lightning or high energy transients would provide a suitable response.

A problem that had to be overcome when using cascaded shunt regulators with inductors as series pass elements was unwanted transformer coupling of voltage spikes from the inductor in the first shunt regulator to the inductor in the second shunt regulator. This problem is overcome by arranging the inductors so their respective magnetic fields responsive to current flow are substantially orthogonally (90°) disposed relative to each other.

The fast acting regulator stages preferably should be of a nature to respond to transient voltage spikes only a few volts above normal line peak voltage so the dissipation levels encountered in the fast acting voltage limiting device when it is voltage limiting are not excessively large. At the same time, voltage limiting on the mains power line peaks should be avoided during high line conditions, again to limit dissipation levels in the fast acting voltage limiting devices. It was found that charge storage techniques provide an excellent means to provide the proper clamp voltage as well as allowing the transient-induced charge to be bled away safely over time. Symmetrical peak detection of the A-C mains voltage, using current rectifier diode and capacitor energy storage configurations, provide a way to track the normal peak variations in the mains voltage to generate a potential stored on the peak detector capacitor(s) against which potential shunt regulation is done. Furthermore, the same current rectifier diodes used for peak detection are usable, during a high energy transient voltage spike, for clamping the spike to the reference potential(s) stored on the energy storage capacitor(s) of the symmetrical peak detector, provided the diodes are properly rated.

Since the voltage impressed across a varistor as was previously employed in such applications might be 500 volts, and the current 2,000 amperes, the POWER dissipated in the varistor would be 1,000,000 watts! The power dissipation in a power rectifier diode for the same 2,000 ampere condition would be only 2,000 amperes times 2 volts (the voltage across the diode during the 2,000 ampere conduction), or 4,000 watts, which is over 2 orders of magnitude lower, and within the transient rating of practical, inexpensive power rectifier diodes such as 1N5407 or 6A8. With the present invention, the power from the transient surge is thus safely dissipated by multiple components: the inductor(s); the power rectifier diodes; the charge storage capacitor(s) and the capacitor bleeder circuitry which leaks the charge stored on the storage capacitor(s) over a period of time. Furthermore all components are operated within their reliable transient limits resulting in no performance degradation due to the transients, even after multiple transients.

One arrangement which has been found to be particularly advantageous employs "lossy" inductors in the embodiment of FIG. 1. A "lossy" inductor as that term is used in the present disclosure is an inductor with an inductance in the range of 20 to 200 microhenries, with Q not in excess of 6 at high energy transient frequencies (10 kHz–50 kHz) and whose characteristics do not substantially deteriorate during transient energy pulses. Such an inductor may be wound using a soft iron bar as a core, for example. A suitable inductor consists of about 50 turns of #14 magnet wire wound on a form with a diameter of 1.25 inches and a length of 2.5 inches, wound as a single layer solenoid.

What is claimed is:

1. A surge suppressor for repeatedly protecting a load against surges occurring on A-C power mains from lightning surges or the like comprising:
    first and second input terminals adapted for connection to an A-C power mains;
    first and second output terminals adapted for connection to a load circuit;
    first series circuit means comprising a first inductance and a first alternating voltage limiting means including at least an associated first capacitance and a bidirectionally conductive peak rectifying means, coupled between said first and second input terminals, said first inductance conducting substantially all of the current supplied from said A-C power mains to said first input terminal;
    second series circuit means comprising a second inductance and second alternating voltage limiting means including at least an associated second capacitance and a second bidirectionally conductive peak rectifying means, coupled across said first alternating voltage limiting means and coupled to said first and second output terminals;
    said first series circuit means being arranged for during normal operation for charging said associated first capacitance to a substantially constant voltage substantially equal to normal peak alternating voltage levels of said A-C power mains and for limiting surge currents and voltage excursions passed to said second series circuit to first levels, and
    said second series circuit being arranged for conducting during normal operation for substantially constant voltage substantially equal to normal peak alternating voltage levels of said A-C power mains and for limiting surge currents and voltage excursion passed to said first and second output terminals to second levels less than said first levels.

2. A surge suppressor according to claim 1 wherein:
    said first inductance is connected to said first alternating voltage limiting means at a first junction, and said second inductance is connected between said first junction and said first output terminal.

3. A surge suppressor according to claim 1 wherein:
    said first and second inductances are connected in series relation between said first input terminal and said first output terminal, said first voltage limiting means being connected from a junction between said first and second inductances to said second output terminal.

4. A surge suppressor according to claim 3 wherein:
    said second voltage limiting means is connected across said first and second output terminals.

5. A line surge suppressor according to claim 3 wherein:
    said second voltage limiting means limits voltage excursions across said output terminals to a level of substantially 250 volts during surges of 6000 volts across said input terminals.

6. A line surge suppressor according to claim 3 wherein:
    said second voltage limiting means limits voltage excursions across said output terminals to a level of substantially 1.5 to 2 times the peak A-C mains voltage.

7. A surge suppressor according to claim 1 where at least one of said limiting means comprises:
    first and second oppositely poled current rectifier means coupled to said associated capacitance of said at least one limiting means for conducting in response to peak positive and negative voltage excursions.

8. A surge suppressor according to claim 7 and further comprising:
    means for bleeding charge from said first capacitance when said rectifier means are non-conducting.

9. A surge suppressor according to claim 8 wherein:
    said means for bleeding charge comprises a current flow indicator including a resistance coupled across said first capacitance.

10. A surge suppressor according to claim 7 wherein:
    said first capacitance comprises first and second capacitors each having first and second terminals, the first terminal of said first capacitance and the second terminal of said second capacitance being connected together and the other terminals of said capacitors being connected to said rectifiers.

11. A surge suppressor according to claim 10 wherein:
    said capacitance terminals which are connected together being coupled to said second input terminal.

12. A surge suppressor according to claim 1 wherein at least one of said alternating voltage limiting means comprises:
    a first current rectifier and a second current rectifier joined together at a first circuit junction and coupled in series opposition between one end of the inductance of said last-mentioned limiting means and said second input terminal;
    a third current rectifier and fourth current rectifier joined together at a second circuit junction and coupled in inverse series opposition, as compared to said first and second rectifiers, between said one end of said inductance means and said second input terminal; and said associated capacitance is coupled between said first and second circuit junctions.

13. A line surge suppressor for repeatedly protecting a load against surges from lighting or the like on an A-C power main supplying power to said load, said line surge suppressor comprising:

first and second input terminals adapted for connection to said A-C mains;

a first lossy inductor means for conducting substantially all current supplied from said mains to said first input terminal; and a first alternating voltage limiting means, including at least a first capacitance, in series with said first lossy inductor between said first and second input terminals for developing a substantially constant voltage substantially equal to normal A-C mains peak voltage while coupling A-C power from said mains to said load and for limiting excursions of voltage that are substantially in excess of normal voltage peaks of said A-C power, said first alternating voltage limiting means comprises:

first and second oppositely poled current rectifier means coupled to said first capacitance for conducting in response to positive and negative peak voltage excursion including during normal operation.

14. A line surge suppressor according to claim 13 and further comprising:

means for bleeding charge from said first capacitance when said rectifier means are non-conducting.

15. A line surge suppressor according to claim 14 wherein:

said means for bleeding charge comprises a current flow indicator including a resistance coupled across said first capacitance.

16. A line surge suppressor for repeatedly protecting a load against surges from lightning or the like on an A-C power mains supplying power to said load, said line surge suppressor comprising:

first and second input terminals adapted for connection to said A-C mains;

a first lossy inductor means for conducting substantially all current supplied from said mains to said first input terminal;

a first alternating voltage limiting means, including at least a first capacitance, in series with said first lossy inductor means between said first and second input terminals for coupling A-C power from said mains to said load and for limiting excursions of voltage that are substantially in excess of normal voltage peaks of said A-C power, wherein said first alternating voltage limiting means comprises;

a first current rectifier and a second current rectifier joined together at a first circuit junction, and coupled in series opposition between one end of said first inductor means and said second input terminal;

a third current rectifier and fourth current rectifier joined together at a second circuit junction and coupled in inverse series opposition, as compared to said first and second rectifiers, between said one end of said first inductor means and said second input terminal; and said first capacitance is coupled between said first and second circuit junctions.

17. A line surge suppressor for repeatedly protecting a load against surges from lightning or the like on an A-C power mains supplying power to said load, said line surge suppressor comprising:

first and second input terminals adapted for connection to said A-C mains;

a first lossy inductor means for conducting substantially all current supplied from said mains to said first input terminals; and a first alternating voltage limiting means, including at least a first capacitance, in series with said first lossy inductor means between said first and second input terminals for coupling A-C power from said mains to said load and for limiting excursions of voltage that are substantially in excess of normal voltage peaks of said A-C power;

said first alternating voltage limiting means further comprising first and second oppositely poled current rectifier means coupled to said first capacitance for conducting in response to positive and negative voltage excursions, and wherein:

said first capacitance comprises first and second capacitors each having first and second terminals, the first terminal of said first capacitance and the second terminal of said second capacitance being connected together and the other terminals of said capacitors being connected to said rectifiers.

18. A line surge suppressor according to claim 17 wherein:

said capacitance terminals which are connected together being returned to said input terminal.

19. A line surge suppressor according to claim 17 and further comprising:

means comprising a current bleeding resistance coupled between said other terminals of said capacitors for discharging said capacitors.

20. A line surge suppressor according to claim 19 wherein:

said means for discharging said capacitors further comprises a current flow indicator.

* * * * *